(12) United States Patent
Kambhatla et al.

(10) Patent No.: US 8,493,905 B2
(45) Date of Patent: Jul. 23, 2013

(54) WIRELESS CLONE MODE DISPLAY

(75) Inventors: Srikanth Kambhatla, Portland, OR (US); Guoqing Li, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 224 days.

(21) Appl. No.: 12/877,152

(22) Filed: Sep. 8, 2010

(65) Prior Publication Data
US 2012/0057517 A1 Mar. 8, 2012

(51) Int. Cl.
*H04J 3/08* (2006.01)
(52) U.S. Cl.
USPC ........................................................ 370/315
(58) Field of Classification Search
USPC .................... 370/315, 390, 473, 492, 277
See application file for complete search history.

(56) References Cited

U.S. PATENT DOCUMENTS

| | | | | |
|---|---|---|---|---|
| 4,750,171 A | * | 6/1988 | Kedar et al. | 370/445 |
| 5,537,217 A | * | 7/1996 | Kajita et al. | 386/278 |
| 2004/0237104 A1 | | 11/2004 | Cooper et al. | |
| 2007/0061414 A1 | | 3/2007 | Bakke | |
| 2007/0086750 A1 | * | 4/2007 | Yeh | 386/112 |
| 2008/0057887 A1 | * | 3/2008 | Tucker et al. | 455/151.2 |
| 2008/0227387 A1 | * | 9/2008 | Andersson | 455/15 |
| 2009/0222807 A1 | | 9/2009 | Fu et al. | |
| 2010/0183004 A1 | | 7/2010 | Kobayashi | |
| 2011/0047583 A1 | * | 2/2011 | Howard et al. | 725/109 |

OTHER PUBLICATIONS

PCT International Search Report and Written Opinion issued in corresponding PCT/US2011/047018, dated Mar. 19, 2012, 10 pages.

* cited by examiner

*Primary Examiner* — Chi Pham
*Assistant Examiner* — Fahmida Chowdhury
(74) *Attorney, Agent, or Firm* — Trop, Pruner & Hu, P.C.

(57) ABSTRACT

Wireless sinks, such as displays, may receive wirelessly transmitted audio/video information in clone mode. In one embodiment, the same audio/video stream may be provided to a plurality of sinks daisy chained from a wireless receiver.

18 Claims, 4 Drawing Sheets

WIRELESS CLONE MODE DISPLAY

BACKGROUND

This relates to wireless display over an interface protocol.

An interface protocol is a protocol that enables the display of information from a wireless source. For example, DisplayPort is a digital audio/video interconnect standard of the Video Electronic Standard Association (VESA). It allows video and audio to be coupled from a computer to a video display or an audio playback system. The DisplayPort connector supports one, two, or four data pairs in a main link and also carries clock and optional audio signals with symbol rates of 1.62, 2.7, or 5.4 gigabits per second. Version 1.1 of the standard was announced in May 2006 and, in 2009, version 1.2 of the standard, with increased data rates, was announced. The DisplayPort 1.2 standard doubles the bandwidth of the 1.1 standard.

Another interface protocol is High-Definition Multimedia Interface (HDMI). HDMI is an audio/video interface for transmitting uncompressed digital data, in television or personal computer video format, including standard, enhanced, and high-definition video and up to eight channels of digital audio. See the HDMI specification, 1.38 Intellectual Property Statements, available from HDMI Licensing LLC., Nov. 10, 2006.

Wireless video and/or audio information may be provided to a DisplayPort or HDMI source for subsequent transmission to a sink. Then, it is framed for wired interfaces, such as Display Port or HDMI or for wireless interfaces.

A feature of display source devices, such as notebook personal computers, is a clone mode of operation of monitors, allowing the same content to be presented on two or more displays.

DETAILED DESCRIPTION

In accordance with some embodiments, wireless multicasting in clone mode may be established. In some embodiments, sinks that are the target for the clone mode may change dynamically and clone mode may be implemented for audio or video streams in some embodiments. In some embodiments, over-the-air bandwidth and system memory bandwidth consumption are conserved.

Figure 1:
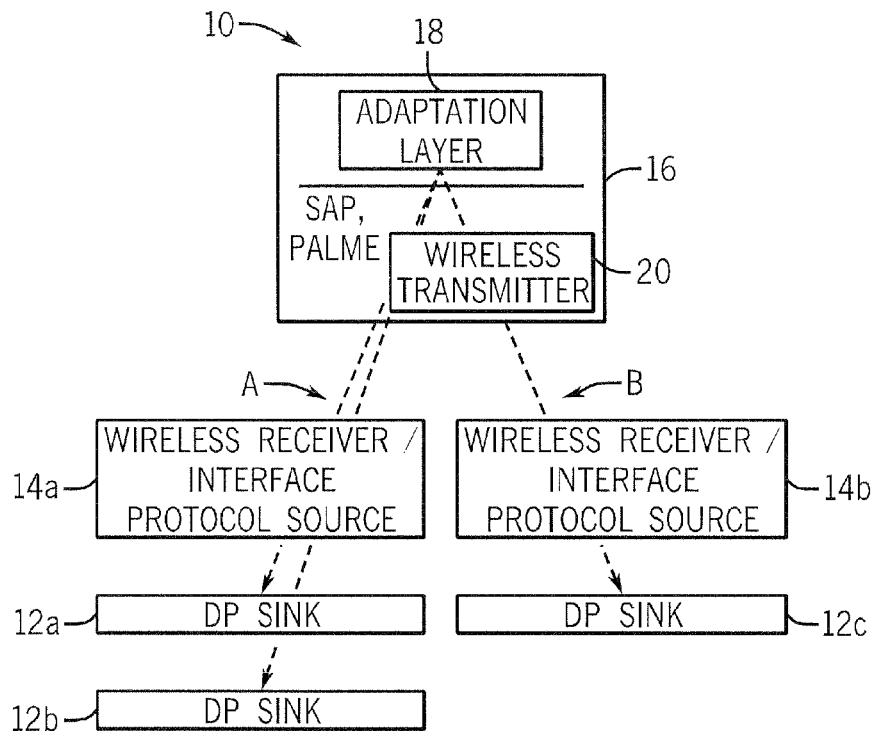
FIG. 1 is a schematic depiction of multiple sinks in clone mode in accordance with one embodiment.

Referring to FIG. 1, a wireless network 10 may include cloned sinks 12a and 12b and sink 12c. A "sink" is any device that displays, stores, or uses video or plays, uses, or stores audio. In one embodiment, the sinks 12 may be DisplayPort specification compliant sinks, but sinks in accordance with other interface protocols, such as HDMI, may also be utilized.

The sinks 12 are linked to a wireless receiver and (through the wireless receiver to) a DisplayPort compliant source 14 in one embodiment. The wireless receiver receives high data rate wireless signals over a first wireless protocol and provides them according to an interface protocol, such as DisplayPort or HDMI. The high data rate signals may be 60 GHz and multiple gigabits per second, for example.

Two receiver/sources 14 are used in the illustrative embodiment, one connected to the sinks 12a and 12b in clone mode and the other connected to the sink 12c. Of course, a variety of other network layouts or architectures may be utilized in other embodiments.

Wireless signals are transmitted from a transmitter 20. In one embodiment, the transmitter 20 may include an interface protocol adaptation layer 18 that adapts packets to the nature of the interface protocol used by the sinks 12. For example, the transmitter 20 and receiver source 14 may be based on the HDMI protocol, for example, so they may need to be adapted to work with DisplayPort compliant sinks 12.

Multiple streams are wirelessly transmitted, as indicated at A, using daisy chaining in accordance with the DisplayPort 1.2 specification, according to one embodiment. The two sinks 12a and 12b may be displays that are daisy chained in this way, connected to a DisplayPort capable source 16.

Clone mode may be achieved using the DisplayPort 1.2 framework and a technique for mapping DisplayPort over a different wireless upstream protocol, enabling DisplayPort and HDMI control packets to be communicated over a wireless protocol in a passthrough mode. A passthrough mode is a wireless communication mode that enables the wireless transmitter/receiver pair to supply packets, without processing them, to an interface protocol source. A single copy of the audio and video streams may be sent over-the-air to the receiver 14. The single copy is fetched from system memory in the source 16. The number of destinations for this single audio/video stream is managed through DisplayPort sideband messages and passthrough packets. The sideband messages are messages passed through to an interface protocol transmitter. The cloning is totally transparent to the wireless upstream protocol in this scenario. As a result, multiple copies are not needed. Each stream originates from a single local copy, so reducing the number of copies reduces bandwidth consumption and power consumption.

The information to be transmitted over a DisplayPort link may be handled separately based on the type of information. Information that must be communicated every frame over the upstream wireless link is a first type, information that need not be transmitted because it is already available at the DisplayPort transmitter is another type, and a third type is information that needs to be transmitted by the upstream source, but can be transmitted less often. Examples of information that does not change with each frame is video mode geometry, synchronization polarity, and color format. This type of information may be uploaded and included as part of an audio/video connection set up information that is cached by the DisplayPort source and used over in every frame.

Stereoscopic 3D information is an example of critical timing coordination needed between control and data planes that can be sent every frame. Clock recovery information includes the timing details of pixel clock values. The system management entity on a receiver determines the N and N values. These do not need to be sent over-the-air and, instead, pixel clock metadata, to enable derivation of M and N, may be sent over the air so that this information may be derived at the appropriate receiver.

A vertical blanking identifier may be sent from a DisplayPort source to a DisplayPort sink in every frame. A data signal indicates presence in a vertical blanking interval, presence of an active video stream, and audio mute. The presence in the vertical blanking interval and presence of an active video stream is information that is available at the DisplayPort sink. The audio mute must be sent every frame because it is dynamic. It may be communicated in the video stream control packet, to be described hereinafter. Then the receiver constructs and delivers a video blanking identifier.

Video metadata, audio data, and audio metadata may be transmitted in the video blanking interval over-the-air. Audio and video data may be separated from audio/video metadata in some embodiments.

The connection setup metadata may include identifiers which indicate in the audio/video link layer whether the ultimate sinks are DisplayPort compliant, HDMI compliant, or compliant with some other system. For DisplayPort video, information may be provided in the form of metadata that is provided by the upstream receiver to the DisplayPort transmitter to calculate the M and N values. The DisplayPort audio context may include DisplayPort audio information including information to indicate the data bytes of an audio frame, a sampling frequency in Hertz for 23:16, the sampling frequency in Hertz for 15:8, and the sampling frequency in Hertz for 7:0.

In some embodiments, audio information frame packets may only be sent at the A/V connection time by the upstream transmitter. The upstream receiver caches and then subsequently retransmits to the DisplayPort link, the connection information at a rate determined by the DisplayPort specification. Audio time stamp packets are generated by the system management entity based on the sampling frequency transmitted in an A/V connection setup. The system management entity on the transmitted ensures DisplayPort requirements on audio packet frequency are met when audio is transmitted without video. Audio data is sent with a header, as defined in the DisplayPort. The header is included in every frame, in some embodiments.

The technique for mapping the DisplayPort framework over the wireless protocols may include a connectivity model to define layering of functionality needed for DisplayPort wireless protocol based wireless displays, a definition of DisplayPort interface identification, registration and deregistration on the upstream wireless protocol, and DisplayPort passthrough packet definition.

The connectivity model and functionality layering is shown in FIG. 1 (right side, indicated by arrow B) according to one embodiment. The adaptation layer 18 is the display source in a protocol adaptation layer (PAL) client. It may perform DisplayPort mapping in one embodiment. An upstream wireless protocol PAL transmitter 20 and an upstream wireless protocol receiver and DisplayPort source 14b may be formed. The DisplayPort sink 12c is a PAL client and a display sink.

Figure 2:
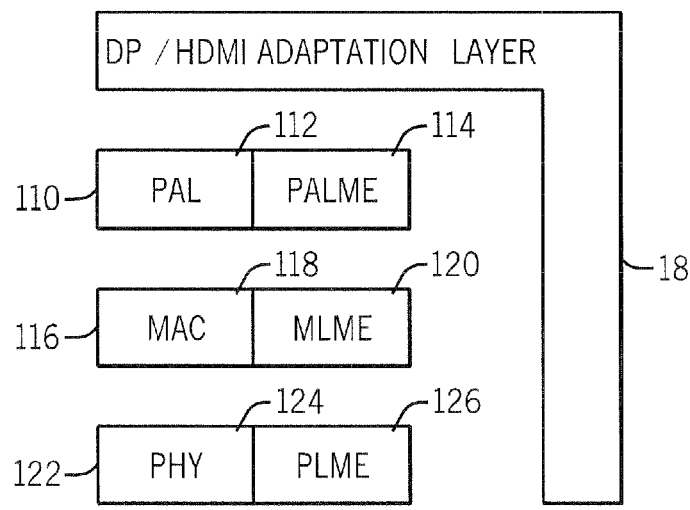
FIG. 2 is a software architecture for a layering model according to one embodiment.

Referring to FIG. 2, a DisplayPort or HDMI adaptation layer 18 is formed over a PAL Service Access Point (SAP) 110, including a PAL 112 and a PAL Management Entity (PALMS) 114. A MAC SAP 116 includes the MAC 118 and a MAC Layer Management Entity (MLME) 120. A physical layer SAP 122 includes the physical layer 124 and a Physical Layer Management Entity (PLME) 126.

An interface type field may be added to the A/V capability request and response and two A/V PAL control packets may be exchanged between a transmitter and a receiver. The interface type field may include a zero for HDMI interface type, a one for a DisplayPort interface type, and other bits may be reserved for other interface protocols. An A/V capability request packet may include bits for a feature list, compression capability, audio delay, interfaced audio delay, audio buffer, and video delay. The response may include bits for an interlaced video delay, a video buffer, Enhanced Extended Display Identification Data (E-EDID) presence, E-EDID, vendor specific code, and interface type.

Registration and deregistration primitives may be defined in a PALME-A/V-Interface Registration request that is used to register an interface with a PAL entity. The semantics of this primitive is as follows:

```
PALME-A/V-InterfaceReg.request.request {
    InterfaceType
}
```

PALME-A/V-InterfaceReg.confirmation is used to confirm the result of the registration of an interface type with a PAL entity for the requesting interface type. The ReasonCode is not interpreted if the reason code is success. The semantics of this primitive is as follows:

```
PALME-A/V-InterfaceReg.request {
    ResultCode
    ReasonCode
}
```

The PALME-A/V-InterfaceUnreg.request may be used to unregister an interface with a PAL entity for the requested interface type. The semantics of this primitive is as follows:

```
PALME-A/V-InterfaceUnReg.request {
    InterfaceType
}
```

The PALME-A/V-InterfaceUnreg.confirmation is used to confirm the result of deregistration of the interface type with a PAL entity. The ReasonCode is not to be interpreted if the ReasonCode is success. The semantics of this primitive is as follows:

```
PALME-A/V-InterfaceUnReg.request {
    ResultCode
    ReasonCode
}
```

The packet definition for over-the-air information exchange may use a DisplayPort passthrough packet that includes bits for passthrough_content, passthrough_type, and a transaction identifier. The transaction identifier field contains the value that identifies a specific transaction of passthrough data transfer. The passthrough type field defines a type of content being passed through and the passthrough content carries the actual passthrough data. The valid values for the passthrough type include 0x00 for a HotPlugDetect (HPD) notify (long pulse), 0x01 for an HPD sink event (short pulse, such as an interrupt), 0x02 for an auxiliary channel transaction packet for control transactions, 0x03 for a sideband message packet, 0x04 for a secondary data packet for control information, and 0x05 for a video stream control packet. The video stream control packet may include an offset of 0x01 and 0x02 for stereoscopic 3D information and an offset 0x03 for audio mute information. Other values may be reserved.

The passthrough content of the auxiliary channel transaction packet may be formatted according to the definition of auxiliary transfer syntax specified in Section 2.7 of the DisplayPort 1.2 specification. The passthrough content of the sideband message may be formatted according to the definition of a sideband layer, specified in Section 2.11.3 of the DisplayPort 1.2 specification. The passthrough content of the sideband message packet may be formatted according to the definition of secondary data packet formats specified in Section 2.2.5 of the DisplayPort 1.2 specification.

The PALME-A/V-PassthroughData.request primitive may be used to request the PAL to transfer the passthrough data to a peer PAL entity. The semantics of this primitive is as follows:

```
PALME-A/V-PassthroughData.request {
    Peer STA address
    PacketType
    Length
    Passthrough Payload
}
```

The PALME-A/V-PassthroughData.confirmation primitive is used to confirm the result of a requested passthrough data transfer from the requesting PAL entity. The Reason-Code is not to be interpreted if the ReasonCode is success. The semantics of this primitive is as follows:

```
PALME-A/V-PassthroughData.request {
    ResultCode
    ReasonCode
}
```

The PALME-A/V-PassthroughData.indication primitive is used to indicate to the PAL information about received passthrough data from a peer PAL. The semantics of this primitive is as follows:

```
PALME-A/V-PassthroughData.request {
    PacketType
    Length
    Passthrough Payload
}
```

Another cloning scenario involves a clone mode between two sinks that have separate upstream wireless protocol receivers 14a and 14b. When a source of audio or video data identifies a sink, such as the sink 12c, it triggers the PAL layer to use an audio/video connection setup procedure to establish a new connection with the sink 12c. The display source 16 passes in a value of zero for the stream identifier, according to this procedure, causing the A/V PAL to assign a stream identifier which is non-zero. This non-zero stream identifier is returned to the source after the A/V PAL updates its internal stream management table (SMT) with the stream identifier destination medium access control address tuple.

Figure 3:
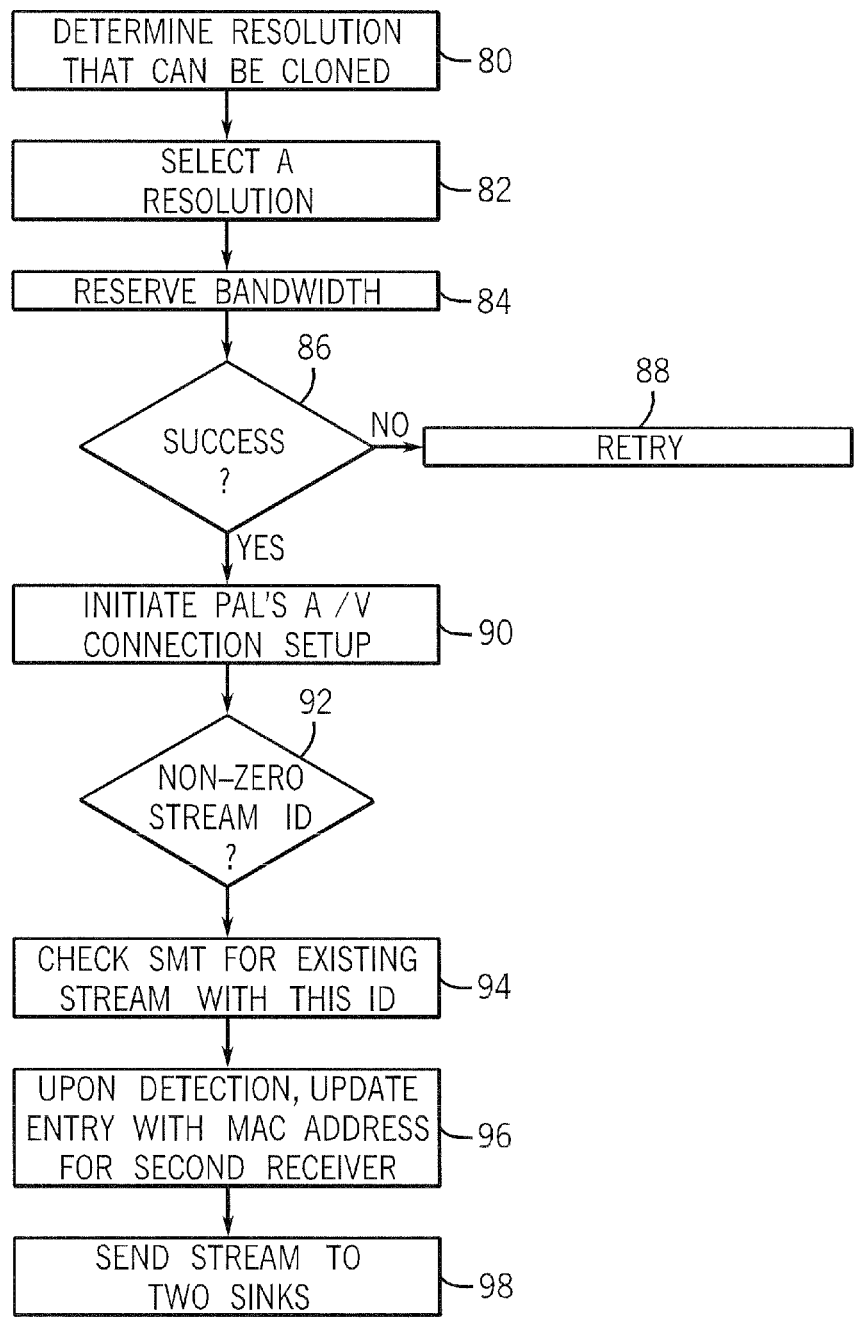
FIG. 3 is a flow chart for one embodiment of a clone mode.

To clone this stream into a different sink, the source attempts to reserve upstream wireless protocol bandwidth for a second copy of the stream using a wireless interface-specific primitive (such as AddTS in case of a certain 60 GHz interface), as indicated in block 84 of FIG. 3. If this does not succeed, the source does not have enough bandwidth for a second copy of the same stream. In this case, unless the configuration falls under the scenario with upstream wireless protocol receivers in close proximity allowing a single beam, described below, the current stream cannot be cloned. The user will need to lower the resolution and retry cloning. To minimize the chances of error, source implementations may first determine the video resolutions that can be cloned (block 80), and change the stream resolution to one for which upstream wireless protocol bandwidth can be duplicated and then initiate cloning (block 82).

If the attempt to reserve upstream wireless protocol bandwidth for a second copy of the stream using a wireless interface primitive (such as the AddTS primitives) succeeds (diamond 86), the source has enough bandwidth for a second copy of the same stream. Otherwise, there may be a retry (block 88). Then the source initiates upstream wireless protocol PAL's A/V connection setup procedure to establish a second connection (block 90). Since this is a clone of an existing stream, the stream passes to this procedure the non-zero stream identifier value previously established by the A/V PAL. When the A/V PAL notices a non-zero stream identifier (diamond 92), it checks its SMT for an existing stream with this identifier (block 94). Upon detection, it updates that SMT entry with the medium access control address of the second receiver which is now the destination of the same stream and returns the same stream identifier back to the display source by way of conformation (block 96). If a match in the SMT is not found for this non-zero stream identifier, this is a failure scenario which results in an error being sent back to the caller. From this point on, the existing A/V stream is sent to two sinks through two unicast streams (block 98).

In some embodiments, this procedure may minimize or reduce system memory bandwidth consumption because only one fetch from memory is needed, but upstream wireless protocol bandwidth consumption is duplicated. This latter limitation can be addressed when two upstream wireless protocol receivers fall into the scenario described next, where the receivers are within line of sight, allowing a single beam to be sent to both receivers, enabling a single over-the-air multicast transmission of content.

A single over-the-air multicast transmission of content is enabled if a call is added to the upstream wireless protocol Medium Access Control (MAC) Layer Management Entity-Service Access Point (MLME-SAP) to enable a source to inquire whether a single beam can be formed to the two upstream wireless protocol receivers identified by their medium access control addresses. The medium access control layer may determine this internally based on data from the physical layer. The procedure for this check, which alters the clone mode, begins with the source issuing a call to the MLME-SAP to determine if a single beam can be provided via line of sight to the two medium access control addresses. If not, then the previous scenario is the only possibility for the clone mode. If a single beam can be provided via line of sight, the source requests the A/V PAL to use a PAL multicast protocol. The resulting multicast address is provided to both sinks 12a and 12b. The source transmits the audio/video stream to the multicast address, enabling both sinks to receive the same stream.

This technique enables a single fetch from system memory, conserving memory bandwidth and results in a single copy of the stream being transmitted over the air to the two upstream wireless protocol receivers, resulting in upstream wireless protocol bandwidth reduction.

The PAL multicast protocol includes a join procedure in which a source node or multicast group owner sends out a PAL control message called multicast group join invite, either in a unicast fashion or in a broadcast fashion. The multicast group is uniquely identified in the invite message by a multicast medium access control address and a PAL identifier. Upon receiving the invite message, a destination node may send a PAL control message, called a multicast group join request to the multicast group owner. The multicast group owner replies with a PAL control message called multicast group join response message that indicates the join status, such as success or failure, with reasons such as invalid group address and no resource available.

In a leave procedure, a destination mode sends a multicast group leave request message of a source node. Upon receiving the multicast group leave request message, the source replies with a multicast group leave response message. The destination node stops receiving multicast packets after receiving the multicast group leave response message or after a timeout.

After a destination node joins a multicast group, it periodically sends multicast group confirm request messages to the source. The source replies with a multicast group confirm response message. If data frames sent to the multicast group are received, but the multicast group confirm response frame is not received, the destination still considers itself to be part of the multicast group. The destination node considers itself not in the multicast group any more if neither confirm, response frame nor data frame were received from the multicast group owner within a timeout.

The source node may terminate a destination node's membership or terminate the whole multicast group by sending a multicast group termination message. If the medium access control address identified in the termination message is an individual medium access control address, a single destination node is terminated. If the medium access control address identified in the termination message is a multicast medium access control address, the whole multicast group is terminated and all destination nodes in the multicast group are terminated.

Figure 4:
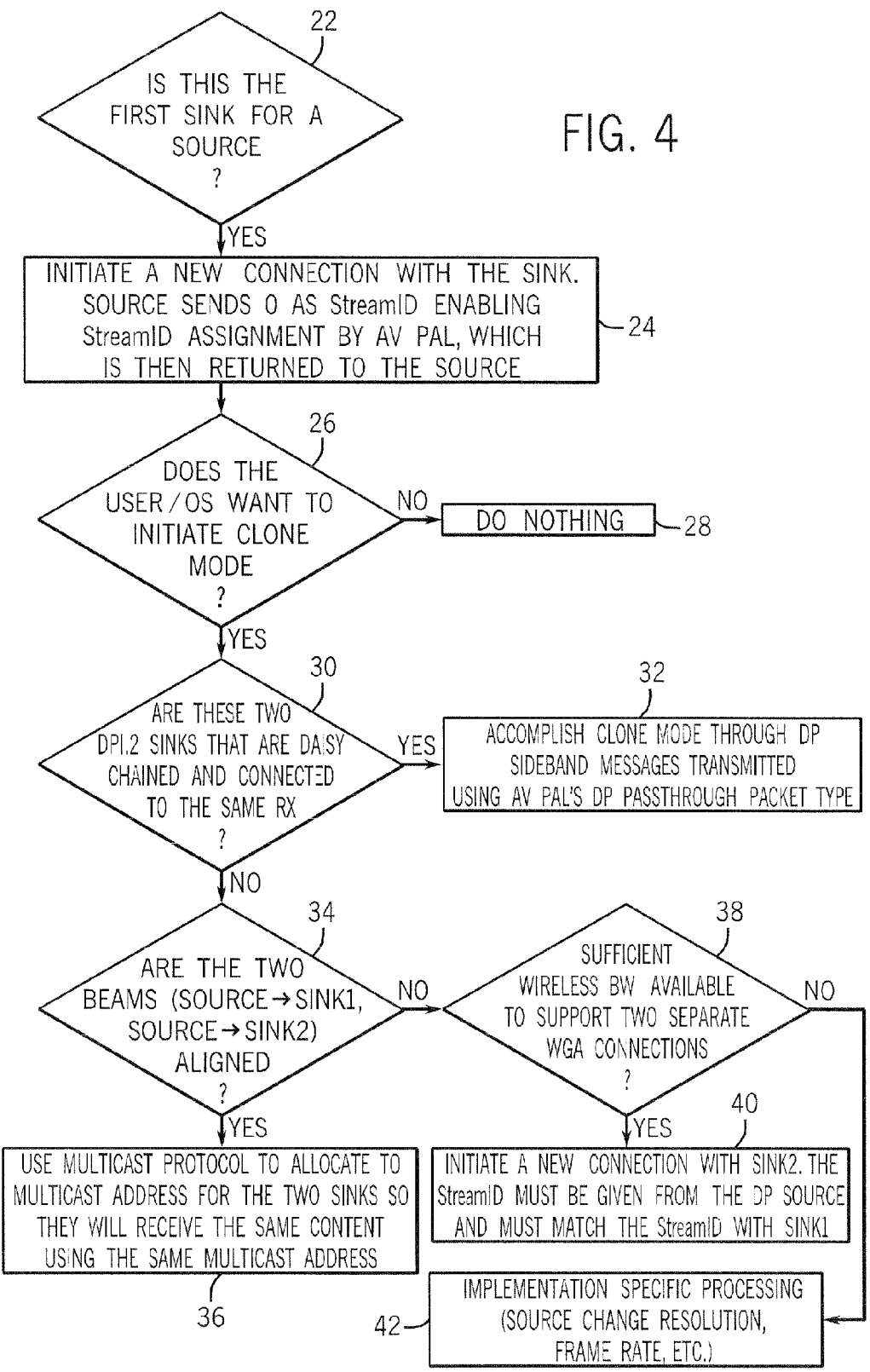
FIG. 4 is a flow chart for another embodiment of a clone mode.

Referring to FIG. 4, a check at diamond 22 determines if this is the first sink for a source. If not, the flow determines and, otherwise, a new connection is initiated with the sink. The source sends zero as a stream identifier, enabling the stream identifier assignment by the A/V PAL, which is then returned to the source, as indicated in block 24.

Then, a check at diamond 26 determines whether the user or the operating system wants to initiate clone mode. If not, nothing is done, as indicated in block 28 and, otherwise, a check at diamond 30 determines whether the two DisplayPort 1.2 specification sinks that are daisy chained and connected are connected to the same upstream wireless protocol receiver. If so, the clone mode is accomplished through the DisplayPort sideband messages that are transmitted using A/V PAL's DisplayPort passthrough packet type, as indicated at block 32. Otherwise, a check at diamond 34 determines whether the two beams from the source to the sink one and from the source to the sink 2 are aligned. If so, the multicast protocol is used to allocate multicast address for the two sinks so that they will receive the same content using the same multicast address, as indicated at block 36. Otherwise, a check at diamond 38 determines whether there is sufficient wireless bandwidth available to support two separate upstream wireless protocol connections. If so, a new connection is initiated with the second sink. The stream identifier is given from the DisplayPort source and must match the stream identifier with the first sink. If not, an implementation specific processing may be needed, as indicated in block 42, which may include source change resolution, frame rate, etc.

In accordance with still another procedure, sink removals and dynamic changes may occur at clone mode destinations. In order to stop an established clone mode stream, the source initiates an audio/video connection termination procedure with the stream identifier and the station address. The A/V PAL looks into the SMT to determine that the stream associated with the stream identifier has multiple destinations. It removes the input station address from that entry and sends a connection termination request to that station. As long as the entry is non-empty, the stream is continued to remaining stations in the SMT entry. When the last station is removed from the SMT, the entry is deleted and the stream identifier can be reused for a new stream. Thus, the SMT for the stream identifier two may indicate as the target a station-address-one.

After the stream is cloned dynamically to both sinks 12a and 12b, each behind a different wireless receiver, then for stream identifier two, the SMT identifies as the target the station address one and the station address two. After the sink one at address one is dynamically removed as a target for the stream, then the SMT table indicates for stream address two the target name only the station at address two. After the stream is stopped from sink two as well, the SMT table has no entry for the stream identifier two and no target for the stream identifier two.

Figure 5:
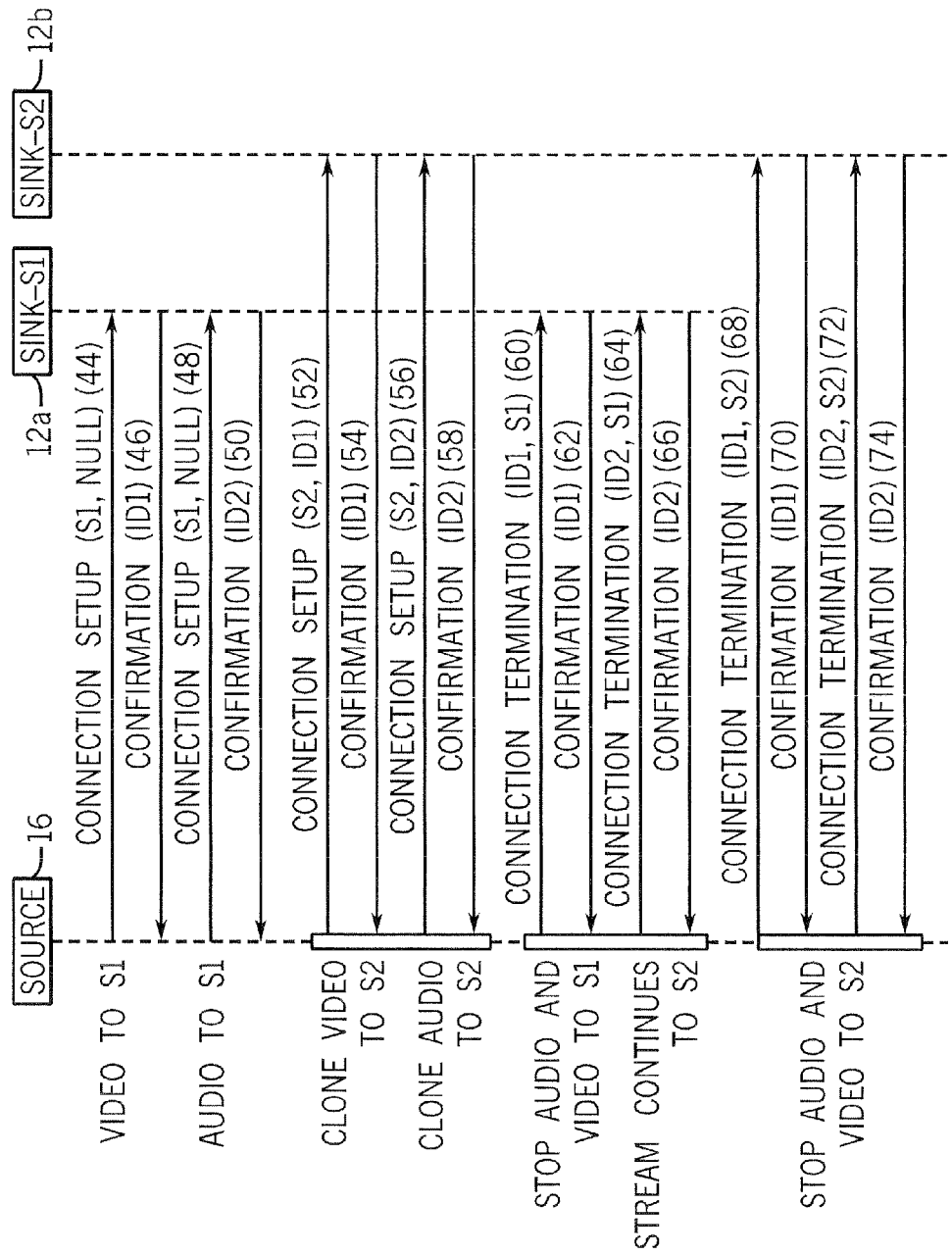
FIG. 5 is a flow chart for another embodiment of a clone mode.

Messages between the A/V PAL layers on the source and sinks is shown in FIG. 5 with the sequence beginning that video is started to sink one, then the audio stream is started to sink 2, and then the video is cloned to sink two, and then the audio is cloned to sink two, followed by stopping of streaming audio and video to sink one, while continuing streaming to sink two and then stopping audio and video to stream two.

Thus, in FIG. 5, the source 16 and sinks 12a and 12b are illustrated. First the video is sent to the source one through a connection setup, as indicated at 44. The sink one 12a sends a confirmation 46 back to the source 16. Then audio is sent to the sink one, as indicated at 48, followed by the confirmation from sink one, indicated at 50. Next, a video is cloned to the source two, as indicated by 52, followed by confirmation at 54. A connection setup 56 is sent from the source to the sink two 12b, followed by confirmation, indicated at 58.

Next, the audio and video from the source one is stopped, as indicated by the connection termination 60 to the source one with confirmation at 62. The connection termination 64 follows, followed by confirmation indicated at 66.

Then the audio and video is stopped to the source two by way of a connection termination 68, confirmation 70, connection termination 72, and confirmation 74.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A method comprising:
wirelessly transmitting an audio/video stream to a plurality of audio/video sinks daisy chained from a wireless receiver;
using passthrough packets in a wireless protocol so the packets pass through a wireless transmitter and receiver without processing in the transmitter or receiver; and using the same stream identifier to establish two connections to send audio/video streams to two different sinks in clone mode.

2. The method of claim 1 including adapting audio/video stream packets in a first interface protocol to a second interface protocol for display on sinks adapted to said second interface protocol.

3. The method of claim 1 including transmitting a single copy of the audio/video stream to a wireless receiver so that only a single copy is fetched at a wireless transmitter.

4. The method of claim 3 including managing destinations for this single copy through sideband messages and passthrough packets.

5. The method of claim 1 including, when two streams with the same stream identifier are detected, updating a table with an address of a second receiver to receive a second audio/video stream with the same stream identifier.

6. The method of claim 1 including sending the same audio/video stream to two receivers using one transmission.

7. A non-transitory computer readable medium storing instructions to enable a processor to:
wirelessly transmit an audio/video stream to a plurality of audio/video sinks daisy chained from a wireless receiver; and
use passthrough packets in a wireless protocol so the packets pass through a wireless transmitter and receiver without processing in the transmitter or receiver; and
using the same stream identifier to establish two connections to send audio/video streams to two different sinks in clone mode.

8. The medium of claim 7 further storing instructions to adapt audio/video stream packets in a first interface protocol to a second interface protocol for display on sinks adapted to said second interface protocol.

9. The medium of claim 7 further storing instructions to transmit a single copy of the audio/video stream to a wireless receiver so that only a single copy is fetched at the wireless transmitter.

10. An apparatus comprising:
a wireless transmitter;
an adaptation layer coupled to said wireless transmitter;
said wireless transmitter to wireles sly transmit an audio/video stream to a plurality of audio/video sinks daisy chained from a wireless receiver; and
said transmitter to use passthrough packets in a wireless protocol so the packets pass through a wireless transmitter and receiver without processing in the transmitter or receiver and to use the same stream identifier to establish two connections to send audio/video streams to two different sinks in clone mode.

11. The apparatus of claim 10, said transmitter to adapt audio/video stream packets in a first interface protocol to a second interface protocol for display on sinks adapted to said second interface protocol.

12. The apparatus of claim 10, said transmitter to transmit a single copy of the audio/video stream to a wireless receiver so only a single copy is fetched at a wireless transmitter.

13. The apparatus of claim 12, said transmitter to use sideband messages and passthrough packages to manage destinations for this single copy.

14. The apparatus of claim 10, said apparatus to update a table within an address of a second receiver to receive a second audio/video stream with the same stream identifier when two streams of the same stream identifier are detected.

15. The apparatus of claim 10, said transmitter to send the same audio/video stream to two receivers using one transmission.

16. A method comprising: determining whether audio/video streams to be sent to two sinks have a common identifier;
if the same identifier is used for streams to be sent to two different sinks, reusing a stream sent to the first sink for the second sink and avoiding a second memory access to send the stream to the second sink;
using the same stream identifier to establish two connections to send audio/video streams to two different sinks in clone mode; and
wirelessly transmitting an audio/video stream to the two sinks.

17. The method of claim 16 including:
checking to see if two receivers can be served by a single beam; and
if both receivers can be served by a single beam, sending the same beam to be received by both receivers.

18. The method of claim 16 using passthrough packets in a wireless protocol so the packets pass through a wireless transmitter and receiver without processing in the transmitter or receiver.

* * * * *